Sept. 11, 1962 C. D. GLOVER 3,053,161

PHOTOGRAPHIC COMPOSING MACHINE

Filed Feb. 3, 1958 4 Sheets-Sheet 1

INVENTOR.
Campbell D. Glover
BY
Munn, Liddy, Daniels & March
ATTORNEYS

INVENTOR.
Campbell D. Glover
BY
Munn, Liddy, Daniels & March
ATTORNEYS

Sept. 11, 1962 C. D. GLOVER 3,053,161

PHOTOGRAPHIC COMPOSING MACHINE

Filed Feb. 3, 1958 4 Sheets-Sheet 3

INVENTOR.
Campbell D. Glover
BY
Munn, Liddy, Daniels & March
ATTORNEYS

Sept. 11, 1962 C. D. GLOVER 3,053,161

PHOTOGRAPHIC COMPOSING MACHINE

Filed Feb. 3, 1958 4 Sheets-Sheet 4

INVENTOR.
Campbell D. Glover
BY
Munn, Liddy, Daniels & March
ATTORNEYS

United States Patent Office 3,053,161
Patented Sept. 11, 1962

3,053,161

PHOTOGRAPHIC COMPOSING MACHINE

Campbell D. Glover, Fort Smith, Ark., assignor of one-half to Weldon Williams & Lick Inc., Fort Smith, Ark., a corporation of Arkansas Filed Feb. 3, 1958, Ser. No. 712,909
5 Claims. (Cl. 95—73)

This invention relates generally to the producing of printing plates, as for example plates used in the offset process, and more particularly to means and methods for composing and producing master positive or negative transparencies as utilized in the making of offset printing plates.

In recent years offset printing has had a phenomenal and rapid growth, and its widespread use has resulted in a close scrutiny of all different phases of the process, to effect simplicity and savings in time and money.

One of the most important steps in the highly technical offset printing process is the preparation of the negative or positive films or transparencies from which the actual printing plates are made. Heretofore, a considerable amount of time was required in preparing such negatives or positives, involving work known as camera and strip-up work. As heretofore practiced, the preparation of such negatives, for example, involved photographing of the material which was to be reproduced and which had been prepared by the layout man and artist. Such material constituted, for instance, type copy, photographs, drawings and the like. After photographing, the resulting negatives, often including multiple duplications, were heretofore painstakingly attached to or stripped up in a mask, in the proper desired positions, and the completed mask with the negatives was then placed in a vacuum frame, in contact with a sensitized metal plate. An exposure of the sensitized plate through the negatives was then made under arc lights, and such exposure transferred the image onto the plate, so that after due chemical processing the plate would become a finished printing plate, adaptable for use in an offset press to run off the printed matter.

The camera and strip up work involved in the above procedure became increasingly time-consuming particularly in those cases where it was desired to transfer to the sensitized plate a number of identical images of the same reproduction. This involved producing a final negative having multiple, identical negative sections each a duplicate of the others, and all properly and accurately registered and aligned. As many as twenty-four such duplicate negative sections may be desired in the said final negative, and accordingly the preparation of this final negative involved considerable time and skill.

Moreover, if the design or image which was to be reproduced required printing in different colors, as for example four colors, it meant that the camera man must obtain twenty-four negatives of each color (or ninety-six negatives in all) and that the stripper must by hand accurately and perfectly register and strip the ninety-six individual negatives into the four masks.

This prior procedure presented many opportunities for error and inaccuracy, and as was to be expected, the finished strip-up would never perfectly register, one color with another. In consequence, there resulted on the whole an inferior set of negative masks, obtained at a prohibitive cost.

In attempting to better this situation, two types of photographic composing or printing machines have been heretofore proposed; one for composing multiple images directly on the plate and one for composing on film. Both of these utilize precision, calibrating screw-threaded adjustments, verniers and the like to obtain precise spacing of multiple, duplicated images, and they have been costly because of their precise structures outlined above, and the operations especially of those for plate printing were undesirably time consuming, because of the long exposure time required in the multiple stepping of the images on the metal plate as compared with the short exposure on film.

The above drawbacks and disadvantages of prior process and devices as above outlined are obviated by the present invention, and one object of the invention is to provide an improved photographic composing machine that will quickly, mechanically produce a single negative or positive composed of multiple negative or positive sections or images, all of which are accurately spaced and in perfect register and alignment.

Another object of the invention is to provide an improved photographic composing machine as above set forth, which will produce a number of perfectly registerable color negatives each of which has multiple images or multiple negative sections.

A feature of the invention resides in the provision of an improved photographic positive or negative composing machine as above characterized, which eliminates the necessity for the vacuum frame heretofore utilized in exposing and making contact between original transparency and the film to be composed.

Another feature of the invention resides in the provision of an improved composing machine as outlined, which obviates the necessity for a separate line-up table, because a line-up device is built in and for arc lights heretofore utilized in effecting the exposure being replaced by an improved light source designed for dark room use.

Another important object of the invention is to provide an improved photographic composing machine which makes possible the rapid and inexpensive producing of "make-over" offset printing plates when one "goes bad" on the press, by enabling one quick and accurate exposure with a multiple-image negative in place of the usual multiple exposures such as are requisite to the fabrication of the multiple image printing plates.

A further feature of the invention resides in the provision of an improved photographic composing machine having the above features and advantages and which is nevertheless simple in its construction and operation, economical to fabricate, reliable and accurate in operation, and sturdy and dependable whereby it has a long useful life.

Other features and advantages will hereinafter appear.

In the drawings accompanying this specification, similar characters of reference indicate corresponding parts wherever possible in the several views, in which.

Figures 1, 11:
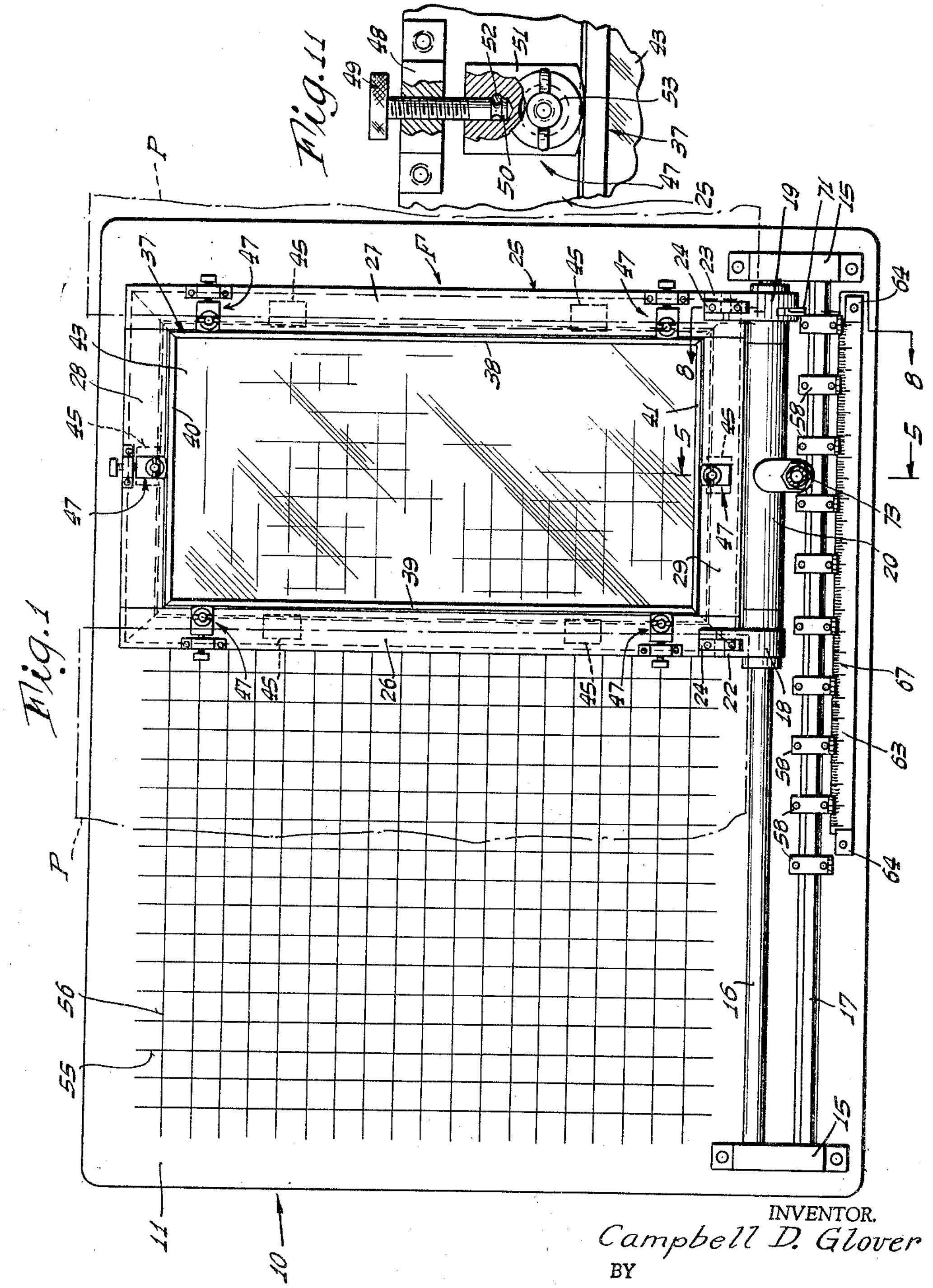
FIG. 1 is a top plan view of an improved negative composing machine constructed in accordance with the invention.
FIG. 11 is a top view partly in section of the adjustable clamp shown in FIG. 1.

Referring to FIG. 1, the present improved composing machine illustrated therein comprises a rigid, flat and low base member or bed 10 which may be advantageously constituted as a casting of hard aluminum alloy or the like. The base member 10 is of rectangular shape and has a perfectly flat top surface 11, depending peripheral flanges 12, and a plurality of radially-extended reinforcing ribs 13 in its under surface to effect a sturdy and rigid structure which is resistant to deformation while at the same time being of relatively light weight.

Figure 8:
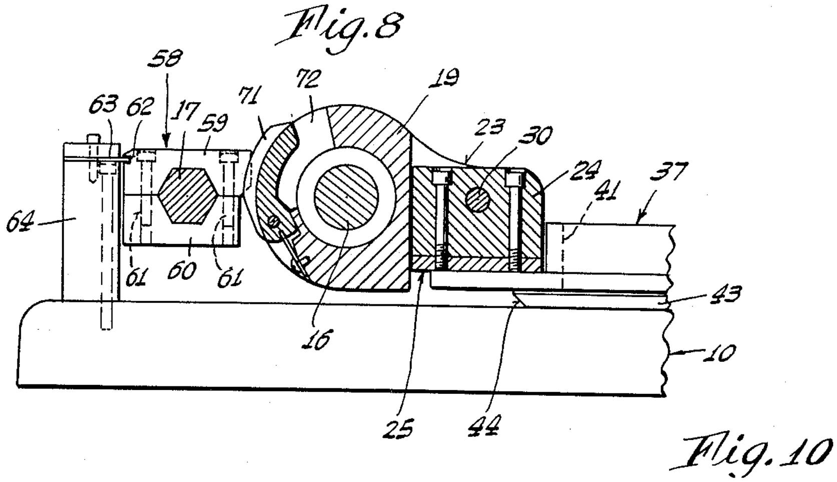
FIG. 8 is a fragmentary vertical sectional view taken on line 8—8 of FIG. 1.

Secured to the top of the base 10 at two corners thereof are mounting brackets or blocks 15 on which are supported two parallel, rigid bars 16 and 17, the former being preferably cylindrical in cross section and the latter of hexagonal cross section, as indicated in FIG. 8. The bar 16 is herein also termed a negative carriage bar, and the bar 17 a stop bar.

As provided by the present invention, the bars 16 and 17 function to position a rectangular frame assemblage F which is adapted to carry photographic negative or positive transparencies, the arrangement being such that the said transparencies may be located in a multiplicity of different, properly aligned and registered positions over the base 10 whereby successive exposures may be carried out on a sensitized master sheet or film. By this procedure there is obviated the necessity for registering and stripping in by hand a large number of negatives on a mask, with the resultant loss of time represented thereby, defective alignment, and inferior end result. In FIG. 1 the transparency-carrying frame assemblage, while designated generally by the letter F, preferably consists of inner and outer frame portions hereinafter described in detail, said frame portions being mounted in a novel and advantageous manner, as follows.

Slidably carried by the carriage bar 16 are fittings or collars 18 and 19, between which there is disposed an elongate sleeve 20, said collars and sleeve being turnable with respect to each other about the bar 16 and the entire assemblage being easily slidable longitudinally along the bar.

The collars 18 and 19 are provided with bifurcated arms 22 and 23 respectively, said arms receiving tongues 24 which are rigidly secured to an outer frame portion 25 of the frame assemblage F, said portion 25 having a rectangular configuration and consisting of relatively long, front and rear frame members 26 and 27, and relatively short, side frame members 28 and 29. The tongues 24 are preferably pivotally attached to the arms 22 and 23 to permit limited turning movement, as by set screws 30, so as to enable the frame assemblage F to remain perfectly flat or horizontal while slightly raised by different amounts above the bed 10.

Figure 2:
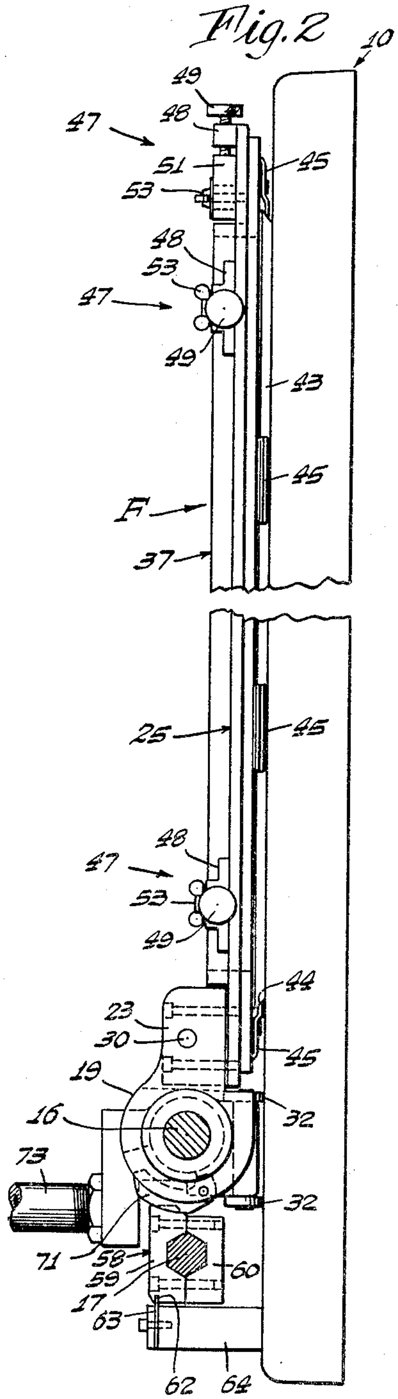
FIG. 2 is a front elevational view of the machine shown in FIG. 1, with a portion of the exposure-lamp mounting means removed.

As thus constituted, the outer frame portion 25 and the frame assemblage F may be swung up and to the left in a counterclockwise arc about the bar 16 lowered from the position shown in FIG. 2, the collars 18 and 19 in conjunction with the bar 16 constituting a hinge means for this purpose. Also, the outer frame portion 25 may be slid longitudinally along the bar 16, to enable the frame to overlie various different portions of the base or bed 10.

Figures 5, 7:
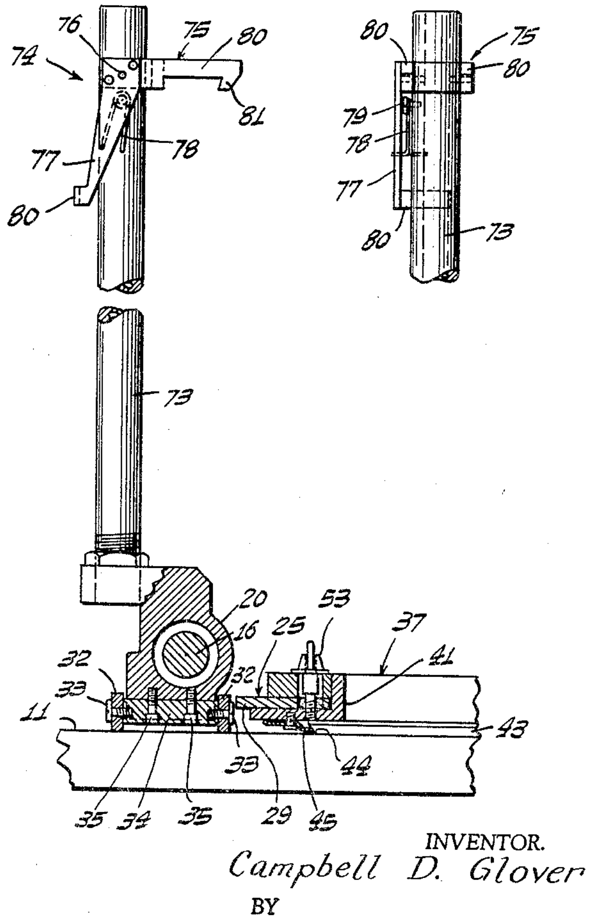
FIG. 5 is a fragmentary vertical sectional view taken on line 5—5 of FIG. 1.
FIG. 7 is a side elevational view of the upper portion of the lamp standard.
Figure 4:
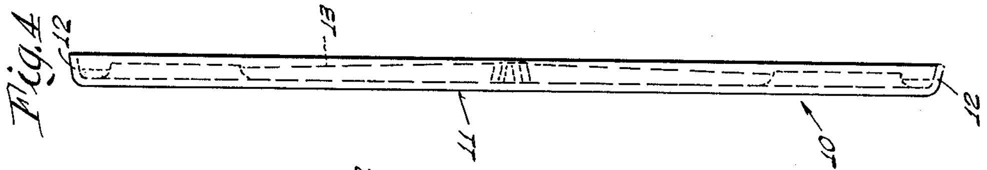
FIG. 4 is an edge view of the base portion shown in FIG. 3.
Figure 3:
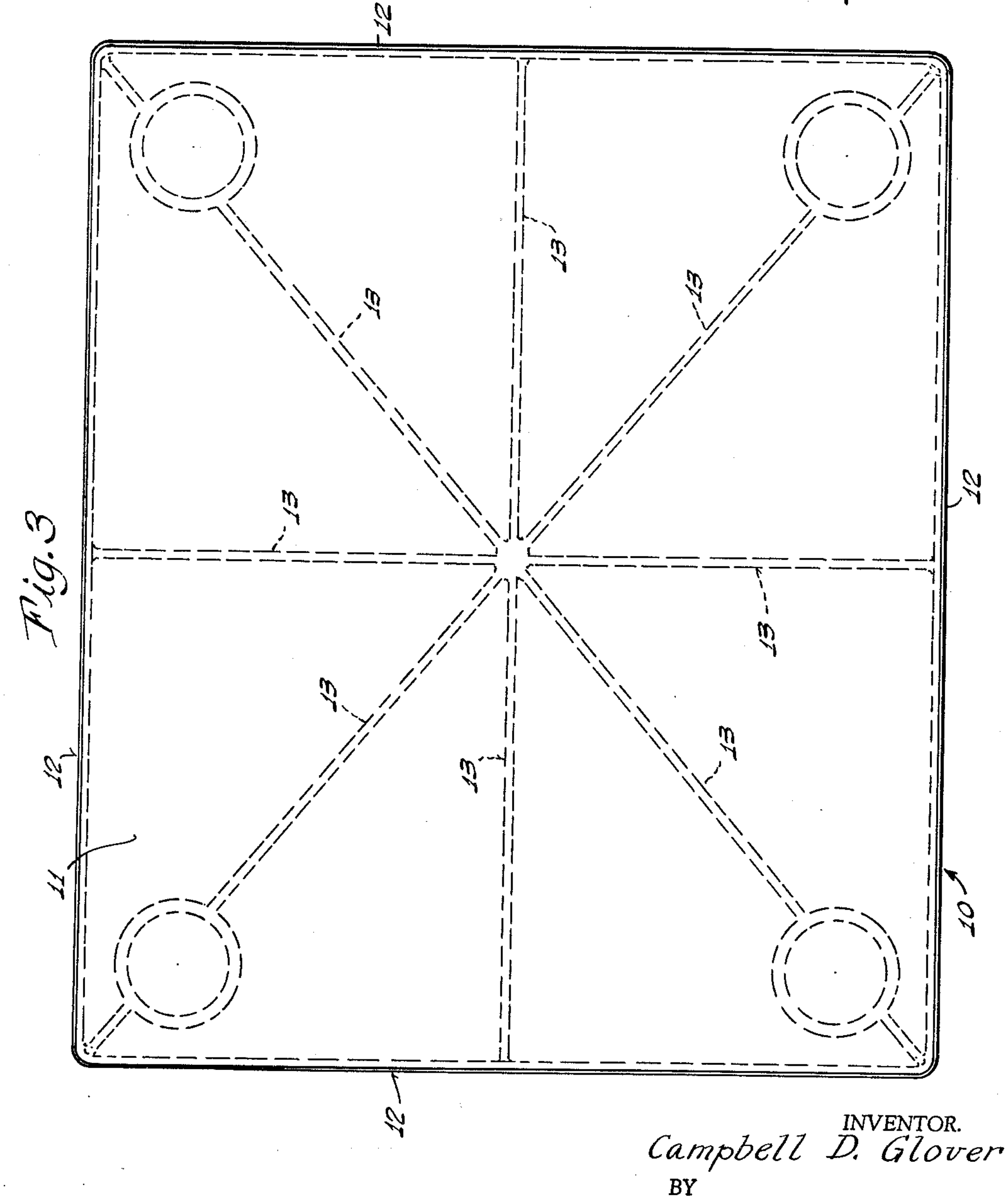
FIG. 3 is a top plan view of the base portion or bed only of the machine.

During the swinging movement of the frame portion 25 about the bar 16, the sleeve 20 will not turn, such sleeve having mounted at its under side a plurality of roller bearings 32 bearing on the top surface 11 of the base 10, as shown in FIG. 5. The rollers 32 may be carried in any suitable manner, as by means of bearing screws 33 threaded into a carriage block 34 fastened by means of screws 35 to the sleeve 20.

Adjustably carried by the outer frame portion 25 of the frame F is an inner rectangular frame portion 37 consisting of relatively long, front and rear frame members 38 and 39, and relatively short side frame members 40 and 41. As seen in FIG. 5, the four members of the inner frame are of substantially L-shaped cross section and fit within the members of the outer frame portion, which are relatively flat and rectangular in cross section. The inner frame portion 37 has secured to its underside a rectangular plate 43 of perfectly clear glass, said plate preferably having beveled edges 44 engaged by clamps 45 fastened to the under side of the inner frame portion 37 (see FIG. 5).

In accordance with this invention, the inner frame portion 37 is adjustably secured to the outer frame portion 25 by a plurality of adjustable clamps 47 (also called line-up and lock-up devices). As seen in FIGS. 1 and 2, the adjustable clamps 47 may comprise threaded posts 48 carrying adjusting screws 49 having annularly grooved extremities 50 locked in clamping blocks 51 by means of pins 52, the clamping blocks 51 have apertures through which thumb screws 53 pass, said screws being threaded into the frame members of the inner frame portion 37 and passing through large openings or slots in the frame members of the outer frame portion 25. When the thumb screws 53 are loose, the slots in the members of the outer frame 25 permit both arcuate and translational adjustment of the inner frame portion 37 with respect to the outer frame portion, thereby to enable alignment and registration of images carried by the frame F with marks on the bed 10, as will be later more fully brought out. It will be understood that such adjustment is effected by properly turning the adjusting screws 49, and that the adjustment is locked by tightening the thumb screws 53.

With a frame F as thus constructed, an image transparency such as a negative may be secured to the under side of the glass plate 43, as by first removing the inner frame portion 37. The negative is roughly squared off, with respect to the sides of the frame portion 37, whereupon the latter is replaced in the outer portion 25. Thus, the negative may be made to overlie the top surface of the base or bed 10. By providing a multiplicity of crossed hair lines or register marks 55 and 56 extending at right angles to each other on the bed or base 10, such as may be inscribed by a suitable sharp tool, the negative or other transparency may now be squared off or brought into accurate orientation with respect to the hairlines 55 and 56 through adjustment of the clamps 47.

The hairlines 55 are made exactly parallel to the bar 16. It is intended that a sensitized sheet or film be placed on the bed or base 10 under the frame F, whereupon after the frame has been lowered over the sheet the negative or other transparency carried thereby will be superposed on the sheet, to enable an exposure of the sheet to be made for reproducing the image of the negative. Where the sensitized sheet and negative has appreciable thickness, the entire frame assemblage F may occupy a raised position as permitted by the pivot screws 30 and the limited arcuate movement permitted between the tongues 24 and the bifurcated arms 22 and 23. Thus, the frame assemblage F and the plate 43 carrying the transparencies may under all circumstances rest perfectly flat and level, on the sensitized sheet which is supported on the base 10.

For the purpose of establishing and enabling duplication of different predetermined positions of the frame assemblage F over the bed 10, I provide along the length of the bar 17 a plurality of lugs or stops 58, each comprising a pair of halves 59 and 60 as shown in FIG. 2, secured together in clamping relation by draw screws 61. The lug halves 59 have slots 62 in which a scale or gauge strip 63 extends, said strip being mounted on blocks 64 secured to the base 10 and being provided with precisely-located graduations 66 representing inch lengths and so numbered, and with additional graduations 67 representing thirty-seconds of an inch. The stops 58 have index marks 69 spaced apart by ¼ of an inch and referable to the graduations 66 and 67 for the purpose of accurately setting or positioning the stops along the bar 17.

As seen in FIGS. 1, 2 and 8, the frame-carrying collar 19 is provided with a spring-charged, pivoted abutment finger 71 carried in a slot 72 of said collar, said finger being engageable with the stops 58 to position the frame assemblage F at various predetermined places along the carriage bar 16. By releasing the spring finger 71 the frame assemblage F may be shifted to any desired stop, and by properly, accurately spacing the stops 58 the frame assemblage F may be made to occupy a number of different, precisely related and located, easily and quickly duplicated positions over the base or bed 10.

It is now seen that the device of the present invention does not embrace costly, precise, calibrated screw threads, verniers and the like to obtain precise positioning of the frame assemblage F with respect to the bed 10, and thus precise spacing of each of multiple images, but instead involves a different principle based more on a precise duplication of spacings which are not initially determined by micro adjustments of precise screws, but instead effected by quickly and easily adjusted, sturdy and accurate stops arranged on a sturdy bar or carrier. Thus, great accuracy of duplication is obtained, to effect precise registrations and alignments, all with a simplified and easy-to-operate, relatively inexpensive mechanism.

Figure 6:
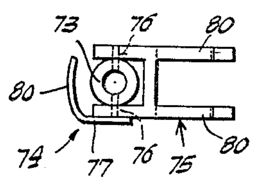
FIG. 6 is a top view of the exposure-lamp standard or stanchion shown in FIG. 5.

Extending upward from the center of the sleeve 20 carried by the carriage bar 16 is a stanchion or post 73, FIGS. 2, 5 and 7, such stanchion having at its upper extremity a releasable frame holder device 74 comprising a member 75 roughly in the form of the letter H (see FIG. 6) carried by pivots 76 extending into the stanchion 73. An operating arm 77 is secured to the member 75, and is spring-biased clockwise by a wire spring 78 carried by a screw 79 threaded into the stanchion. The arm 77 has a finger piece 80 adapted to be depressed so as to lift or swing upward in a counterclockwise arc the member 75, see FIG. 5. Two arms 80 of the member 75 have hooked end portions 81 adapted to engage the frame assemblage F and releasably hold the same in a raised position parallel to the stanchion 73 when this is desired. Release of the frame assemblage F is effected by depressing the finger piece 80 of the arm 77.

Figures 9, 10:
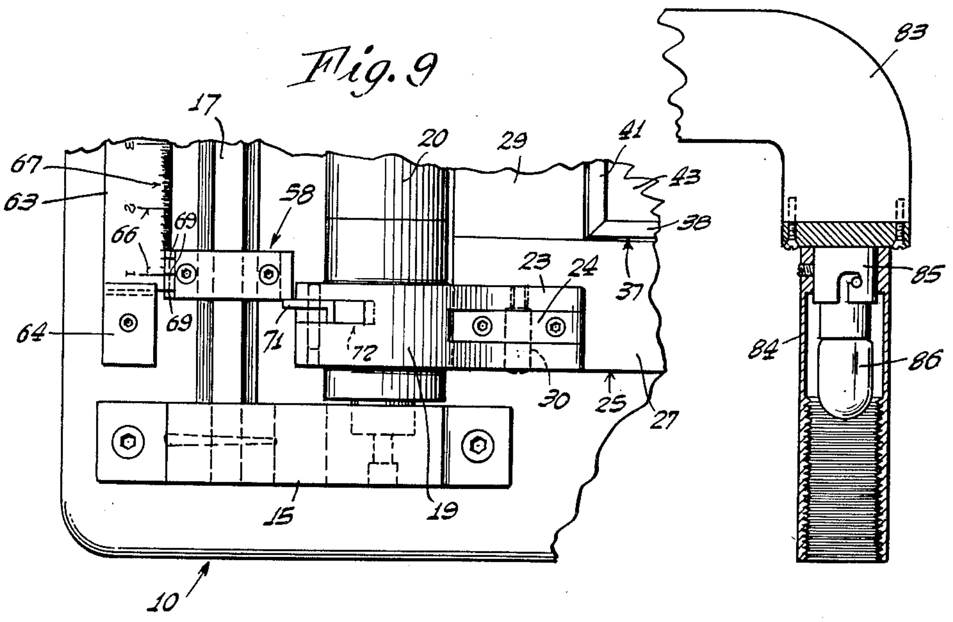
FIG. 9 is a top plan view of the portion of the device seen in FIG. 8.
FIG. 10 is a fragmentary vertical sectional view of the exposure lamp assembly carried by the lamp standard shown in FIG. 5.

Referring to FIG. 10 there is shown a lamp standard 83 adapted to be secured by any suitable holder above the frame assemblage. Attached to and depending from the lamp standard 83 is a lamp casing or shield 84 carrying a socket 85 in which an incandescent lamp 86 is mounted. The shield 84 is open at the bottom, to permit light from the lamp 86 to be directed downward from a point above the frame assemblage F, said light thus passing through the glass plate 43 and transparency carried thereby, and striking and exposing the sensitized sheet placed on the base or bed 10. The interior of the light shield 84 is provided with screw threads 88, to reduce glare from the lamp 86.

Operation of the improved photographic composing machine as above set forth, is as follows. Depending on the size of the image which is to be reproduced a number of times on the negative material, the stops 58 are appropriately set along the stop bar 17 to effect the number of duplications necessary. The inner frame portion 37 is removed from the outer frame portion 25 by loosening and removing the winged screws 53. The original negative which is to be composed is now stripped onto the plate glass 43, in approximately square relationship with the edges of the frame portion 37. The plate glass is thereafter masked over its entire remaining area, and the inner frame portion 37 is replaced in the outer frame portion 25. Thereafter the negative is aligned with the register marks or hairlines 55 and 56 on the bed 10, placing it in perfect alignment with the carriage bar 16, and as previously explained such operation is carried out by adjusting the adjustment screws 49. The wing screws 53 are now tightened.

The above alignment procedure eliminates the need of a separate line-up table which was heretofore required on prior composing machines, and further obviates the use of a light or stripping table. Sheets of masking paper are now taped to the front and rear frame members 26 and 27 of the frame assemblage F, to mask out unwanted light that might expose undesirably other portions of the sensitized sheet while desired portions have the duplicated exposes carried out thereon. The operator from here on works under the conventional safered light. A sensitized sheet is now placed on the bed 10 and taped in position, the frame assemblage F being lifted for this purpose. The operator now sets the built-in timing device for the required exposure in seconds, adjusts the rheostat for the amount of light required and thereafter makes each exposure by merely pressing a button to activate the timing device and the automatic switch controlled thereby, which effects energization of the lamp 86. The frame or carriage F may be started with an image exposure in the position shown in FIG. 1, wherein the abutment finger 71 is engaged with the right-most one of the stops 58. Upon completion of the exposure, the finger 71 is depressed to release the frame or carriage F, and the latter is shifted to the left, engaging the stop finger 71 with the next stop 58. Thereupon a second exposure is made, providing a second impression on the sensitized sheet. Thereafter, the succeeding exposures are effected by positioning the frame F in other positions along the bar 16, as determined by the succeeding stops 58. Thereafter, the sensitized sheet is developed, resulting in an elongate sheet or strip having a multiplicity of identical, positive images. Where the printing job involves colors, the same procedure is followed for the negatives of each color, with the stops 58 kept at their original settings.

Upon completion of this operation, the stops 58 may be reset for the desired number of exposures to be made with the just-completed multiple-image positive, and such positive strip is then taped to the glass, extending again from one long side to the other long side of the frame F. The same procedure is followed as above outlined, using a new sensitized sheet on the bed 10, and for each setting of the frame F a number of multiple images will be transferred to the sensitized sheet, from the positive transparencies on the frame. In consequence of this latter operation there results a large negative, which may have a size as great as 24 inches square, with any number of images depending on their size. Each of the finished negatives will be perfectly in line, both up and down and across. And, if color work is planned, all of the negatives for the different colors will register perfectly, one with the other. The above procedure gives full-sized negatives that need merely to be stripped into place on a mask to be ready to produce the printing plate. No hand registering or complicated stripping is necessary.

The foregoing explains the operations required to make negatives suitable for producing surface plates. If deep-etch plates are required, the procedure is identical except that a positive is used at the start, instead of a negative, and the end result constitutes a full size positive having a multiplicity of aligned and registered positive images.

It will be understood that, in accordance with the above I have provided a novel and improved photographic composing machine by which there may be quickly produced negative or positive transparencies having a multiplicity of duplicated images accurately positioned and registered. The machine as set forth is relatively simple and inexpensive to produce, is extremely accurate, reliable in its operation, and sturdy so as to provide for long and useful life. It reduces materially the time that was heretofore required in hand stripping and masking negatives to produce large multiple-image transparencies, and provides for an accuracy in the registration and alignment of the images which was not heretofore possible. Further, it obviates the need for line-up tables, arc lights, vacuum frames and the like.

Variations and modifications may be made within the scope of the claims, and portions of the improvements may be used without others.

I claim:

1. A photographic composing machine comprising a flat bed having a plurality of crossed hair lines thereon; a frame adapted to overlie said bed, having means for carrying a transparency; means pivotally mounting said frame on the bed, to enable the frame to overlie the bed in flat, superposed relation or to be swung away therefrom, said mounting means having a pivotal axis closely adjacent the bed and further providing for horizontal translational movement of the frame over the bed in either of opposite directions along the axis of swinging movement; means including a plurality of aligned adjustable stops on the bed and including positioning means carried by the frame for selective engagement with said stops, for enabling the frame to be located in any one of a number of different translational, precisely duplicatable positions over the bed, said means mounting the frame comprising a bar secured to and extending along the bed; a stanchion adapted to carry an exposure lamp, movably mounted on said bar so as to be slidable therealong; and means coupling the frame to the stanchion for simultaneous sliding movement therewith along the bar.

2. The invention as defined in claim 1, in which there are means connected to the stanchion, engageable with the bed for maintaining the stanchion in an upright position.

3. The invention as defined in claim 2, in which the means mounting the frame includes collars secured thereto and encircling the bar, and in which the coupling means includes a sleeve on said bar, disposed between and engaging the said collars.

4. The invention as defined in claim 3, in which the means maintaining the stanchion upright comprises rollers carried by the sleeve and engageable with the said bed.

5. A photographic composing machine comprising a flat bed having a plurality of crossed hair lines thereon; a frame adapted to overlie said bed, having means for carrying a transparency; means pivotally mounting said frame on the bed, to enable the frame to overlie the bed in flat, superposed relation or to be swung away therefrom, said mounting means having a pivotal axis closely adjacent the bed and further providing for horizontal translational movement of the frame over the bed in either of opposite directions along the axis of swinging movement; means including a plurality of aligned adjustable stops on the bed and including positioning means carried by the frame for selective engagement with said stops, for enabling the frame to be located in any one of a number of different translational, precisely duplicatable positions over the bed, said frame comprising an outer frame portion and an inner frame portion, one of said frame portions having the means for carrying the transparency; means providing for adjustable positioning of one frame portion on the other for both arcuate and translational movement with respect thereto, said one frame portion being completely removable from the other frame portion and the means for adjustably positioning the frame portions comprising screw-adjustment fittings carried by one frame portion and means releasably securing the other frame portion to said fittings.

References Cited in the file of this patent

UNITED STATES PATENTS

| | | |
|---|---|---|
| 1,151,460 | Hatt | Aug. 24, 1915 |
| 1,750,294 | Bassist | Mar. 11, 1930 |
| 1,787,662 | Boedicker | Jan. 6, 1931 |
| 2,250,873 | May | July 29, 1941 |
| 2,499,100 | Kessler | Feb. 28, 1950 |
| 2,614,469 | Hillmer | Oct. 21, 1952 |
| 2,711,031 | Kessler | June 21, 1955 |
| 2,772,485 | Gelb | Dec. 4, 1956 |